Patented June 8, 1937

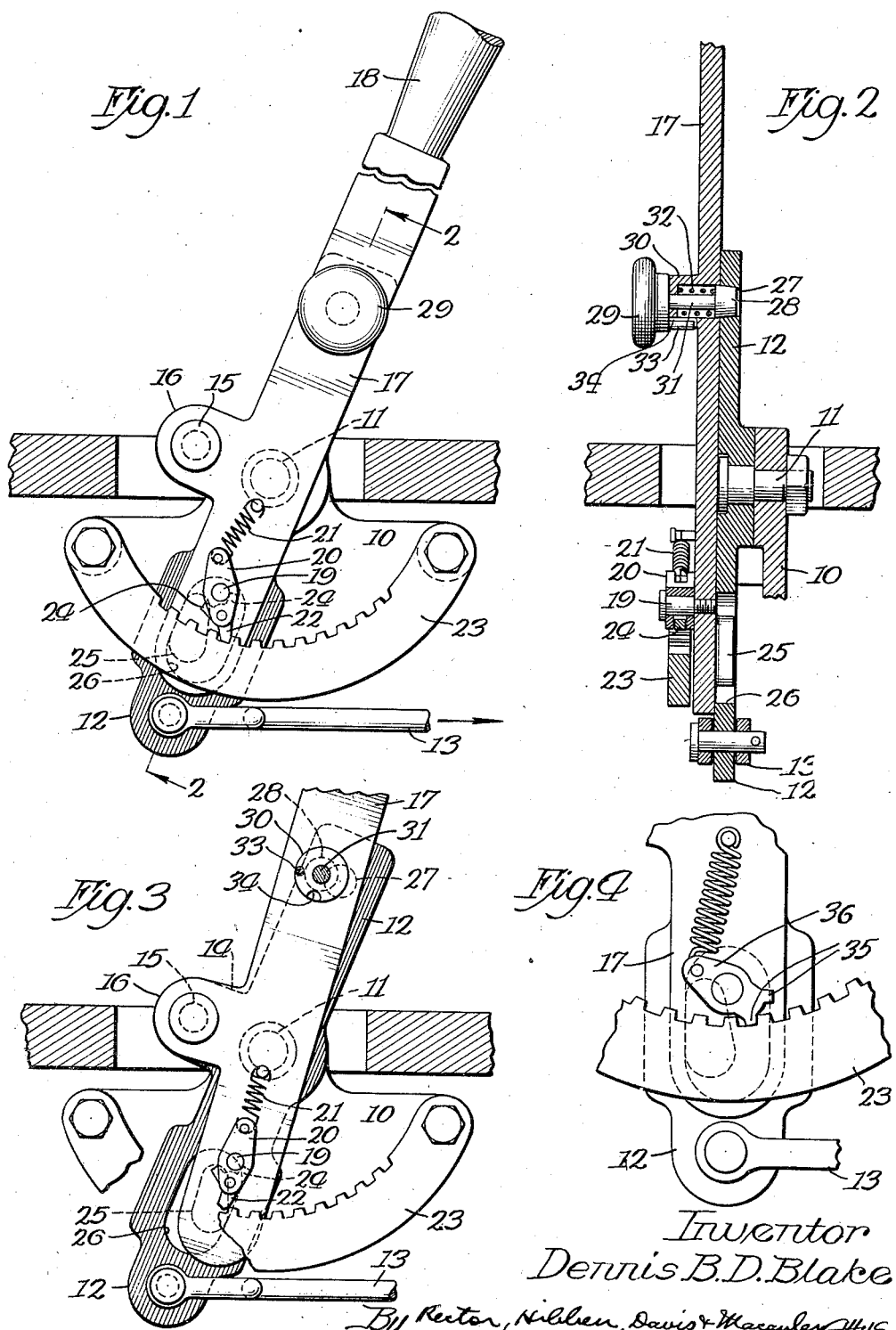

2,082,776

UNITED STATES PATENT OFFICE 2,082,776

BRAKE CONTROL APPARATUS

Dennis B. D. Blake, Danville, Ill., assignor of one-half to Donald E. Willard, Danville, Ill.

Application February 10, 1933, Serial No. 656,099
Renewed April 24, 1936

20 Claims. (Cl. 74—536)

My invention relates to brake control apparatus and more particularly to that type in which a control or emergency brake lever swings over a toothed segment for the purpose of operating the brakes.

One object of my invention is to provide an apparatus in which the usual manually controlled pawl is eliminated, the brakes being applied and released by movements of the control lever only which is maintained in any position to which it may be moved by the tension acting on the brake rod, the locking of the lever in this position being easily disengaged by a simple movement of the lever.

A further object is to devise an apparatus whose principal elements are a pair of levers eccentrically pivoted with respect to each other, the levers being conditioned to move together to apply the brakes and for limited independent movement to release the brakes.

These and further objects of my invention will be set forth in the following specification, reference being had to the accompanying drawing, and the novel means by which said objects are effectuated will be definitely pointed out in the claims.

In the drawing:

Figure 1 is an elevation of my improved apparatus showing the same in a brake-applied position.

Fig. 2 is a sectional view taken along the line 2—2 in Fig. 1, looking in the direction of the arrows, and showing the details of construction of the arrangement for positively locking the levers together.

Fig. 3 is a view similar to Fig. 1, but showing the initial, independent movement of the control lever for releasing the brakes.

Fig. 4 is a view similar to a portion of Fig. 1, but showing a modified pawl connection between the control lever and the rack.

The numeral 10 designates a bracket which is appropriately supported on the frame work of a motor vehicle, for example, and whose upper end extends through an opening provided in the floor board. A pin 11 is fixed in the upper end of the bracket 10 and an auxiliary lever 12 is journaled thereon for a rocking movement. The lower end of the lever 12 is pivotally connected to one end of a brake rod 13 which is connected to any desired type of braking system and which, it will be understood, is always subjected to a tensional pull toward the right, as viewed in Fig. 1, in accordance with standard practice.

Adjacent its pivot support, the lever 12 is provided with an off-set arm 14 for receiving a pin 15 upon which a similar arm 16 is journaled, the latter arm being integrally formed with a control lever 17. Accordingly, it will be understood that the lever 17 is eccentrically mounted on the lever 12, relative to the pivot of the latter. The lever 17 extends upwardly and has formed thereon the customary hand-grip portion 18, while adjacent the lower end of the lever projects from one side thereof a pin 19 that pivotally supports a pawl 20. The upper end of the pawl has connected thereto one end of a spring 21 whose opposite end is appropriately connected to the lever 17, this spring serving to maintain the pawl in any position to which it may be moved as explained more particularly hereinafter. The lower end of the pawl 20 is bifurcated and a finger 22 is pivotally mounted between the separated ends thereof for engagement with the teeth of a rack 23 that may be bolted to the bracket 10. The rack 23 is curved in accordance with usual practice and the curve which includes the teeth of the rack is concentrically struck from the center of the pin 11 for a purpose presently explained. In order to limit the rocking movements of the finger 22, a pair of stop lugs 24 is formed thereon above the pivot point of the finger and located on opposite sides of the pin 19 with which these lugs cooperate.

A lug 25 projects from the opposite side of the lever 17 adjacent the pawl and is received within an elongated slot 26 provided in the lever 12, the width of the lug being somewhat less than the width of the slot so as to capacitate the lever 17 for a movement independently of the lever 12 when operated in one direction and a movement together of these levers when operated in the opposite direction.

The lever 12 extends for some convenient distance above the pin 11 and is provided with an aperture 27 for receiving the enlarged end 28 of a locking pin 29 which is slidably mounted within a hollow boss 30 provided on the lever 17, the intermediate portion 31 of the pin being encircled by a coil spring 32 which always tends to urge the pin toward the right, as viewed in Fig. 2, until the head of the pin contacts with the vertical face of the boss 30. The head of the pin 29 is further provided with a locating finger 33 that is received within a groove 34 provided in the outer wall of the boss 30. In the position shown in Fig. 2, the levers 12 and 17 are locked together by the pin 29, but by withdrawing the pin toward the left and slightly rotating the same until the end of the finger 33 rests upon some portion of the vertical face of the boss 30, it will be understood that the enlarged end 28 will be withdrawn from the aperture 27, thus permitting the levers to move independently under certain conditions.

In describing the operation of my improved apparatus, it will be understood that the pin 29 is disengaged from the lever 12 and that the brake rod 13 is always subjected to a pull toward the right, as viewed in Fig. 1. This pull is taken advantage of in my apparatus to position the control lever 17 in any position to which it may be moved in applying the brakes. In Fig. 1, the several elements are shown in positions in which the brakes are applied, the finger 22 being located between the flanks of a pair of adjacent teeth on the rack 23 and the pull on the rod 13 operating through the left wall of the slot 26 and the lug 25 urging the lever 17 to rotate in a counter-clockwise direction about its pivot 15. However, this rotating tendency of the lever 17 obviously serves to press the finger 22 more firmly into engagement with the rack 23, so that the pull on the rod 13 serves to retain the lever 17 in the position indicated, or one in which the brakes are held in application by the pull on the rod 13 itself. In this position of the lever 17, it will be noted that the lever 12 and the pawl 20 with its finger 22 constitutes substantially a toggle whose knee is the pin 19 and whose other pivot points are the pin 11 and the end of the finger 22. These pivot points are located on a line which passes to the right of the pin 19, as shown in Fig. 1, so that the toggle is locked by the pull on the rod 13.

To release the brakes, the lever 17 is rotated in a counter-clockwise direction about the pivot 15 and, owing to the eccentric disposition of the pin 15 relative to the pin 11, the pawl 20 begins to move away from the rack 23 to thus permit a pivoting action of the finger 22 and a gradual withdrawal of this finger from between the teeth with which it originally engaged. During this action, the foregoing toggle is not broken in the usual way by shifting the knee across the line joining the pin 11 and the finger 22, but by lifting the knee 19 through shifting the upper toggle pivot from the pin 11 to the pin 15. This movement of the lever 17 is wholly independent of the lever 12, as permitted by the freedom of the lug 25 to move across the slot 26, toward the right as viewed in Fig. 1. The width of the slot 26 is such that, by the time the lug 25 has contacted with the opposite side of the slot, the finger 22 will be completely freed from its engaging position with the rack and will be rocked to a position where it simply slides over the teeth of the rack. When the lug 25 contacts with the opposite wall of the slot 26, the finger 22 having been freed as aforesaid, and as substantially shown in Fig. 3, the levers 12 and 17 thereafter move together under the impulse of the pull on the rod 13 and the movement of the lever 17 by the operator. During this latter movement, and until the lever 17 reaches the limit of its position in a releasing direction, the relation between the levers is substantially as shown in Fig. 3, that is, slightly shifted with respect to each other, but upon the lever 17 reaching the noted limit, the pull on the rod 13 moves the lever 12 into a position where the lug 25 contacts with the left wall of the slot 26.

In order to apply the brakes, the lever 17 is moved from the position just noted to the position shown in Fig. 1 and, during this movement, it will be noted that the levers 12 and 17 move together owing to the connection therebetween afforded by the lug 25 and the slot 26, and that this joint movement of the two levers pivots about the pin 11 and thus enables the finger 22 to follow closely the curve along which the rack teeth are located. The lever 17 may be stopped in a position where the brakes are fully applied, or in some intermediate position to exert only a slight retarding effect on the vehicle wheels, but wherever stopped, the relation between the finger 22 and the rack 23 will be such, under the pull of the brake rod 13, that the lever 17 will be effectively retained in position to thereby hold the brakes in the initial position to which they have been moved. The movement together of the indicated levers, in conjunction with the relation between the pivot 11 and the curvature of the rack 23, enables the pawl 22 to be moved over the rack teeth throughout the length of the rack, while the eccentric mounting of the lever 17 provides a simple method of providing for a substantially instantaneous disengagement of the finger 22 from the rack 23 in order to release the brakes. Accordingly, a simple movement of the lever 17 enables the brakes to be applied and released, thus avoiding the usual necessity for an additional rod extending the length of the brake lever for operation by a push button at the top thereof.

The locking pin 29 provides an additional feature for the apparatus and enhances its safety aspect, since it may be employed to lock the levers 12 and 17 together against the possibility of any independent movement of the lever 17, as may be required where the vehicle is parked for a considerable time, or where the vehicle is parked temporarily with children in the car, for example. With the locking pin in the position shown in Fig. 2, it is impossible to inadvertently move the lever 17 to effect a release of the brakes, since this pin locks both levers together and therefore subjects these parts to the pull of the rod 13.

In Fig. 4 is illustrated a modified pawl arrangement, the remainder of the apparatus being identical with that heretofore described. In this type of construction, a single element pawl 36 is provided which is pivoted in the manner described above on the control lever 17. The operating end of the pawl 36 is provided with a pair of spaced lugs or fingers 35 which coact with the teeth of the rack 23 in the manner described above. The advantage of the two element pawl 20 shown in Fig. 1, is that, owing to the capacity of the finger 22 to move relatively to the remaining portion of the pawl, a quicker disengagement of the pawl from the rack can be effected. In other words, it is necessary, with the form of structure shown in Fig. 4, to move the lever 17 through a greater distance before the pawl 34 is rocked to a position where it is free from locking engagement with the rack.

I claim:

1. Brake control apparatus comprising in combination, a rack, an auxiliary lever having an arm, a tensioned brake rod connected to the auxiliary lever and tending to rotate the latter, the arm projecting from the auxiliary lever in a direction generally opposite to the pull of the rod, a control lever pivoted on the arm, one of the levers having a lug and the other lever including a pair of walls spaced a distance greater than the width of the lug and between which the lug operates whereby the levers move together to apply the brakes and the control lever moves independently to release the brakes, and means on the control lever engageable with the rack to position the control lever against the pull of the rod, the independent movement of the control lever withdrawing said means to release the brakes.

2. Brake control apparatus comprising in combination, a rack, an auxiliary lever, a tensioned brake rod connected to the auxiliary lever and tending to rotate the latter, a control lever pivoted on the auxiliary lever, the pivot of the control lever being offset from the pivot of the auxiliary lever and in a direction generally opposite to the pull of the rod, one of the levers having a lug and the other lever including a pair of walls spaced a distance greater than the width of the lug and between which the lug operates whereby the levers move together to apply the brakes and the control lever moves independently to release the brakes, and means on the control lever engageable with the rack to position the control lever against the pull of the rod, the independent movement of the control lever withdrawing said means to release the brakes.

3. Brake control apparatus comprising in combination, a brake rod, a rack, an auxiliary lever connected to the brake rod, a control lever freely pivoted on the auxiliary lever on the opposite side of the rack from said rod connection and movable with and independently of the auxiliary lever to apply and release the brakes, respectively, and means carried by the control lever engageable with the rack to position the control lever against the pull of the rod, the pivot of the control lever being offset from the longitudinal axis thereof passing through the engaging means and the tendency of the control lever to swing about its pivot maintaining the means in engagement with the rack while the brakes are applied, the independent movement of the control lever disengaging said means to release the brakes.

4. Brake control apparatus comprising in combination, a rack, an auxiliary lever, a tensioned brake rod connected to the auxiliary lever on one side of the rack and tending to rotate the auxiliary lever, a control lever pivoted on the auxiliary lever on the opposite side of the rack, the pivot of the control lever being offset from the pivot of the auxiliary lever and rotationally behind the connection of the rod to the auxiliary lever considered with respect to the rotating pull of the rod, one of the levers having a lug and the other lever having a pair of walls spaced a distance greater than the width of the lug and between which the lug operates whereby the levers move together to apply the brakes and the control lever moves independently to release the brakes, and means on the control lever engageable with the rack to position the control lever against the pull of the rod, the independent movement of the control lever withdrawing said means to release the brakes.

5. Brake control apparatus comprising in combination, a rack, an auxiliary lever, a tensioned brake rod connected to the auxiliary lever and tending to rotate the latter, a control lever pivoted on the auxiliary lever, the pivot of the control lever being offset from the pivot of the auxiliary lever and rotationally behind the connection of the rod to the auxiliary lever considered with respect to the rotating pull of the rod, one of the levers having a lug and the other lever including a pair of walls spaced a distance greater than the width of the lug and between which the lug operates whereby the levers move together to apply the brakes and the control lever moves independently to release the brakes, and a pawl pivoted on the control lever and adapted to engage with the rack, the pawl and the auxiliary lever pivot forming substantially a toggle mechanism which is locked by the tension pull of the rod and the independent movement of the control lever breaking the mechanism by withdrawing the pawl from engagement with the rack.

6. Brake control apparatus comprising in combination, a brake rod, a rack, an auxiliary lever connected to the brake rod, a control lever freely pivoted on the auxiliary lever and movable with and independently of the auxiliary lever to apply and release the brakes, respectively, and a pawl pivoted on the control lever and adapted to engage with the rack to position the control lever against the pull of the rod, the pivot of the control lever being offset from the longitudinal axis thereof passing through the pawl pivot and the pawl pivot being offset from a line passing through the auxiliary lever pivot and the engaging point of the pawl when the brakes are set, thereby substantially forming a toggle mechanism which is locked by the tension pull of the rod, the independent movement of the control lever withdrawing the pawl to release the brakes.

7. Brake control apparatus comprising in combination, a brake rod, a rack, an auxiliary lever connected to the brake rod, a control lever fixedly pivoted on the auxiliary lever and movable with and independently of the auxiliary lever to apply and release the brakes, respectively, and a pawl freely pivoted on the control lever and engageable with the rack to position the control lever against the pull of the rod, the pivot of the control lever being offset from the longitudinal axis thereof passing through the pawl pivot and the independent movement of the control lever moving the pawl pivot relative to the rack engaging point of the pawl to thereby rock the pawl to a brake releasing position.

8. Brake control apparatus comprising in combination, a brake rod, a rack, an auxiliary lever connected to the brake rod, a control lever fixedly pivoted on the auxiliary lever and movable with and independently of the auxiliary lever to apply and release the brakes, respectively, and a pawl freely pivoted on the control lever and having a pivoted finger engageable with the rack to position the control lever against the pull of the rod, the pivot of the control lever being offset from the longitudinal axis thereof passing through the pawl pivot and the independent movement of the control lever moving the pawl pivot relative to the rack engaging end of the finger to thereby rock the pawl to a brake releasing position.

9. Brake control apparatus comprising in combination, a brake rod, a rack, an auxiliary lever connected to the brake rod, a control lever fixedly and freely pivoted on the auxiliary lever, connections between the levers causing their movement together to apply the brakes and permitting an independent movement of the control lever to release the brakes, and means on the control lever engageable with the rack to position the control lever against the pull of the rod, the pivot of the control lever being offset from the longitudinal axis thereof passing through the engaging means and the tendency of the control lever to swing about its pivot maintaining the means in engagement with the rack while the brakes are applied, the independent movement of the control lever disengaging said means to release the brakes.

10. Brake control apparatus comprising in combination, a brake rod, a rack, an auxiliary lever connected to the brake rod and including a slot, a control lever fixedly pivoted on the auxiliary lever and having a lug receivable in the slot, the width of the lug being less than that of the slot whereby the control lever is capacitated for movement with and independently of the auxiliary lever to apply and release the brakes, respectively, and means engageable with the rack to position the control lever against the pull of the rod, the control lever pivot being offset from the longitudinal axis thereof passing through the engaging means and the independent movement of the control lever disengaging said means to release the brakes.

11. Brake control apparatus comprising in combination, a curved rack, an auxiliary lever concentrically pivoted relative to the curvature of the rack, a tensioned brake rod connected to the auxiliary lever and tending to rotate the latter, a control lever fixedly and freely pivoted on the auxiliary lever, connections between the levers causing their movement together to apply the brakes and permitting an independent movement of the control lever to release the brakes, and means on the control lever engageable with the rack to position the control lever against the pull of the rod, the pivot of the control lever being offset from the longitudinal axis thereof passing through the engaging means and rotationally behind the connection of the rod to the auxiliary lever considered with respect to the rotative pull of the rod and the tendency of the control lever to swing about its pivot maintaining the means in engagement with the rack while the brakes are applied, the independent movement of the control lever withdrawing said means to release the brakes.

12. Brake control apparatus comprising in combination, a brake rod, a rack, a pivoted auxiliary lever connected to the brake rod, a control lever freely rockable on a stationary pivot carried by the auxiliary lever and movable with and independently of the auxiliary lever to apply and release the brakes, respectively, and means carried by the control lever engageable with the rack to position the control lever against the pull of the rod, the pivot of the control lever being offset from the pivot of the auxiliary lever and the tendency of the control lever to swing about its pivot maintaining the means in engagement with the rack while the brakes are applied, the independent movement of the control lever disengaging said means to release the brakes.

13. Brake control apparatus comprising in combination a rack, a pivoted auxiliary lever, a tensioned brake rod connected to the auxiliary lever and tending to rotate the latter, a control lever freely rockable on a stationary pivot carried by the auxiliary lever, connections between the levers causing their movement together to apply the brakes and permitting an independent movement of the control lever to release the brakes, and means on the control lever engageable with the rack to position the control lever against the pull of the rod, the pivot of the control lever being offset from the pivot of the auxiliary lever and rotationally behind the connection of the rod to the auxiliary lever considered with respect to the rotating pull of the rod and the tendency of the control lever to swing about its pivot maintaining the means in engagement with the rack while the brakes are applied, the independent movement of the control lever disengaging said means to release the brakes.

14. Brake control apparatus comprising in combination, a brake rod, a rack, a pivoted auxiliary lever connected to the brake rod, a control lever freely rockable on a stationary pivot carried by the auxiliary lever on the opposite side of the rack from said rod connection and movable with and independently of the auxiliary lever to apply and release the brakes, respectively, and means carried by the control lever engageable with the rack to position the control lever against the pull of the rod, the pivot of the control lever being offset from the pivot of the auxiliary lever and the tendency of the control lever to swing about its pivot maintaining the means in engagement with the rack while the brakes are applied, the independent movement of the control lever disengaging said means to release the brakes.

15. Brake control apparatus comprising in combination, a brake rod, a rack, a pivoted auxiliary lever connected to the brake rod, a control lever freely rockable on a stationary pivot carried by the auxiliary lever and movable with and independently of the auxiliary lever to apply and release the brakes, respectively, and a pawl pivoted on the control lever and adapted to engage with the rack to position the control lever against the pull of the rod, the pivot of the control lever being offset from the pivot of the auxiliary lever and the pawl pivot being offset from a line passing through the auxiliary lever pivot and the engaging point of the pawl when the brakes are set, thereby substantially forming a toggle mechanism which is locked by the tension pull of the rod, the independent movement of the control lever disengaging the pawl to release the brakes.

16. Brake control apparatus comprising in combination, a brake rod, a rack, a pivoted auxiliary lever connected to the brake rod, a control lever rockable on a stationary pivot carried by the auxiliary lever and movable with and independently of the auxiliary lever to apply and release the brakes, respectively, and a pawl freely pivoted on the control lever and engageable with the rack to position the control lever against the pull of the rod, the pivot of the control lever being offset from the pivot of the auxiliary lever and the independent movement of the control lever moving the pawl pivot relative to the rack engaging point of the pawl to thereby rock the pawl to a brake releasing position.

17. Brake control apparatus comprising in combination, a brake rod, a rack, a pivoted auxiliary lever connected to the brake rod, a control lever freely rockable on a stationary pivot carried by the auxiliary lever and movable with and independently of the auxiliary lever to apply and release the brakes, respectively, and means carried by the control lever engageable with the rack to position the control lever against the pull of the rod, the pivot of the control lever being offset from a line passing through the engaging means and the pivot of the auxiliary lever and the tendency of the control lever to swing about its pivot maintaining the means in engagement with the rack while the brakes are applied.

18. Brake control apparatus comprising in combination, a rack, a pivoted auxiliary lever, a tensioned brake rod connected to the auxiliary lever and tending to rotate the latter, a control lever freely rockable on a stationary pivot carried by the auxiliary lever, connections between the levers causing their movement together to apply the brakes and permitting an independent movement of the control lever to release the brakes, and means on the control lever engageable with the rack to position the control lever against the pull of the rod, the pivot of the control lever being offset from a line passing through the engaging means and the pivot of the auxiliary lever and rotationally behind the connection of the rod to the auxiliary lever considered with respect to the rotating pull of the rod and the tendency of the control lever to swing about its pivot maintaining the means in engagement with the rack while the brakes are applied, the independent movement of the control lever disengaging said means to release the brakes.

19. Brake control apparatus comprising in combination, a brake rod, a rack, an auxiliary lever connected to the brake rod, a control lever freely pivoted on the auxiliary lever and movable with and independently of the auxiliary lever to apply and release the brakes, respectively, and means carried by the control lever engageable with the rack to position the control lever against the pull of the rod, the pivot of the control lever being offset from the longitudinal axis thereof passing through the engaging means and the tendency of the control lever to swing about its pivot maintaining the means in engagement with the rack while the brakes are applied, the independent movement of the control lever disengaging said means to release the brakes.

20. Brake control apparatus comprising in combination, a rack, an auxiliary lever, a tensioned brake rod connected to the auxiliary lever and tending to rotate the latter, a control lever pivoted on the auxiliary lever, connections between the levers causing their movement together to apply the brakes and permitting an independent movement of the control lever to release the brakes, and means on the control lever engageable with the rack to position the control lever against the pull of the rod, the pivot of the control lever being offset from the longitudinal axis thereof passing through the engaging means and rotationally behind the connection of the rod to the auxiliary lever considered with respect to the rotating pull of the rod and the tendency of the control lever to swing about its pivot maintaining the means in engagement with the rack while the brakes are applied, the independent movement of the control lever withdrawing said means to release the brakes.

DENNIS B. D. BLAKE.